United States Patent
Wong et al.

(10) Patent No.: US 7,082,695 B1
(45) Date of Patent: Aug. 1, 2006

(54) POWER-SAVING DRYING MACHINE CONTROL

(76) Inventors: King-Leung Wong, 7F-1, No. 88, Sec. 1, Chung Hwa East Road, Tainan City (TW); Huann-Ming Chou, No. 8, Lane 12, Yung Chuen St, Yung Kang City, Tainan Hsien (TW); Tsung-Lieh Hsien, No. 7, Lane 261, Chorng Shyue Rd., East Dist., Tainan City (TW); Jenn-Fa Lee, No. 949, Da Wan Rd., Yung Kang City, Tainan Hsien (TW)

(*) Notice: Subject to any disclaimer, the term of this patent is extended or adjusted under 35 U.S.C. 154(b) by 0 days.

(21) Appl. No.: 11/042,997

(22) Filed: Jan. 24, 2005

(51) Int. Cl.
*F26B 3/00* (2006.01)

(52) U.S. Cl. ............... 34/486; 34/491; 34/493; 34/497; 34/572; 34/562

(58) Field of Classification Search ............... 34/486, 34/524, 491, 493, 497, 572, 562
See application file for complete search history.

(56) References Cited

U.S. PATENT DOCUMENTS

| | | | | |
|---|---|---|---|---|
| 4,286,391 A | * | 9/1981 | Gerry | 34/543 |
| 4,485,566 A | * | 12/1984 | Vivares | 34/547 |
| 4,640,022 A | * | 2/1987 | Suzuki et al. | 34/552 |
| 5,755,041 A | * | 5/1998 | Horwitz | 34/491 |

FOREIGN PATENT DOCUMENTS

GB  1470163  * 6/1973

* cited by examiner

*Primary Examiner*—Kenneth Rinehart
(74) *Attorney, Agent, or Firm*—Pro-Techton Int'l Services (57) ABSTRACT

A power-saving drying machine control method used in a drying machine is disclosed to include the steps of (a) enabling the temperature (or relative humidity) control unit of a central control unit to start working and to detect the temperature (or relative humidity) at the exhaust port of the drying machine through a temperature (or relative humidity) sensor once per a predetermined time unit when the temperature (or relative humidity) sensor detected a predetermined temperature (or relative humidity) value, and (b) driving the central control unit to shut off the drying machine when at least two temperature (or relative humidity) differences of at least three proceeding temperature (or relative humidity) values obtained from the exhaust port of the drying machine through the temperature (or relative humidity) sensor are within the precision of the temperature (or relative humidity) sensor.

12 Claims, 7 Drawing Sheets

POWER-SAVING DRYING MACHINE CONTROL

BACKGROUND OF THE INVENTION

1. Field of the Invention

The present invention relates to a drying machine and more specifically, to a power-saving drying machine control method, which uses auto control and electromechanical integration techniques and the characteristics of humidity in air to automatically shut off the drying machine in suitable time in order to obtain power consumption saving of the drying machine.

2. Description of the Related Art

Following prosperity of the society, laundry dryer has become one of the requisite electric home appliances. Many salary men, office ladies, or students are living in rented houses that do not provide a drying machine or drying yard for drying clothes. Therefore, laundry stores are opened in everywhere to meet the needs. However, most students cannot afford the high cleaning cost of laundry stores. Laundromats are then created in every corner of big cities around the world. These Laundromats use coin-operated washing machines and dryers for washing and drying laundry clothes. There are many motels providing coin-operated washing machines and dryer. In order to keep a clean outer appearance and to prevent falling accidents, many high-class apartments and mansions do not provide clotheslines or outdoor equipments for drying clothes, and thus residents shall have to use an electric drying machine to dry laundry clothes. The only drawback of a laundry dryer is its high consumption of power supply. However, a laundry dryer is conveniently to use and can prevent wrinkling of the clothes as well. In cities, more and more people use a laundry dryer to dry laundry clothes.

Further, in order to prevent contamination or for convenience and safety's sake, medicine and chemical suppliers commonly use an especial electric drying machine to dry medicines and chemicals.

According to the principle of design for conventional drying machines, air is sucked into the drying machine and heated by an electric heater into a dry air of medium high temperature and low relative humidity to dry laundry clothes (or materials) in a rotary drum that is being rotated by a motor, enabling water to be evaporated from the laundry clothes (or materials) into the air inside the rotary drum, thus the dry air with medium high temperature and low relative humidity is wetted and resulted in lowering its temperature and increasing its relative humidity, and the wet air is then expelled to the outside of the drying machine by means of a pressure difference. This procedure keeps running to make the laundry clothes be well dried. Conventional drying machines commonly use a timer to control the operation. When the set time is up, the time-control system will automatically shut off the machine. The user has to estimate the set time. In actual practice, it needs less time to dry same amount of laundry clothes (or materials) in dry weather than in wet weather. Further, it requires much more time to dry laundry clothes (or materials) that have strong absorptive power than laundry clothes (or materials) that are not absorptive. Therefore, it requires different drying time to dry different kinds and amounts of laundry clothes (or materials) during different ambient temperature or relative humidity. Even an experienced housekeeper (or drying machine technician) cannot accurately judge the drying time for every drying work. If the drying time is set too long, the laundry clothes (or materials) may be overheated, thereby wasting time and energy and causing damage to laundry clothes (or materials). If the drying time is set too short, the laundry clothes (or materials) will not be well dried, and the user shall have to set the timer to dry the laundry clothes (or materials) again. Further, a drying machine is an energy-consumptive device. At present, energy sources are getting short. Therefore, it is the common object of all countries around the world to save energy consumption while making the living comfortable.

Various drying machines and related control methods have been disclosed. According to UK Patent No. 1,470,163, temperature sensors are provided to detect the temperature of air passing through the electric heater and the temperature of air passing out of the drying machine, and the drying machine is shut 5 off when the temperature difference between the two temperature values from the two temperature sensors reaches a predetermined value. According to our tests, the temperature and relative humidity of the weather and the kind and weight of the laundry clothes affect the value of the temperature difference. Therefore, there is no reliable predetermined value shows a specific relationship with the dryness of the laundry clothes. If the predetermined value is set too low, the laundry clothes may be not well dried due to the conditions of low temperature and/or high relative humidity and/or laundry clothes' high water-retaining ability and/or laundry clothes' heavy weight. If the predetermined value is set too high, much energy and time will be wasted due to the conditions of high temperature and/or low relative humidity and/or laundry clothes' low water-retaining ability and/or laundry clothes' light weight. Therefore, this drying machine control method has limited accuracy for commercial application.

U.S. Pat. No. 4,485,566 discloses tumble dryer for the drying of laundry comprises a drum (2) arranged in a housing (1) and driven by a motor (3), heating means (7) for heating the air entering the dryer and being guided through the drum (2), first and second temperature sensing means (12, 13) for sensing the temperatures of the air led into the drum (2) and being discharged from the drum (2), and control means connected to the temperature sensing means (12, 13) for energizing and de-energizing the heating means (7) and the drum motor (3). In order to ensure a cooling down period dependent on the drum content and humidity to achieve a desired remaining humidity of the drum content the air led to the drum is guided for preheating before passing the heating means over and around the drum (2), the first temperature sensing means (12) is arranged for sensing the temperature of the preheated air (10) upstream of the heating means (7) and the control means de-energizes the heating means (7) upon reaching a first presettable temperature difference of the preheated and the discharged air (10, 8) and de-energizes the drum motor (3) upon reaching a second temperature difference of the preheated and the discharged air (10, 8).

Figure 2:
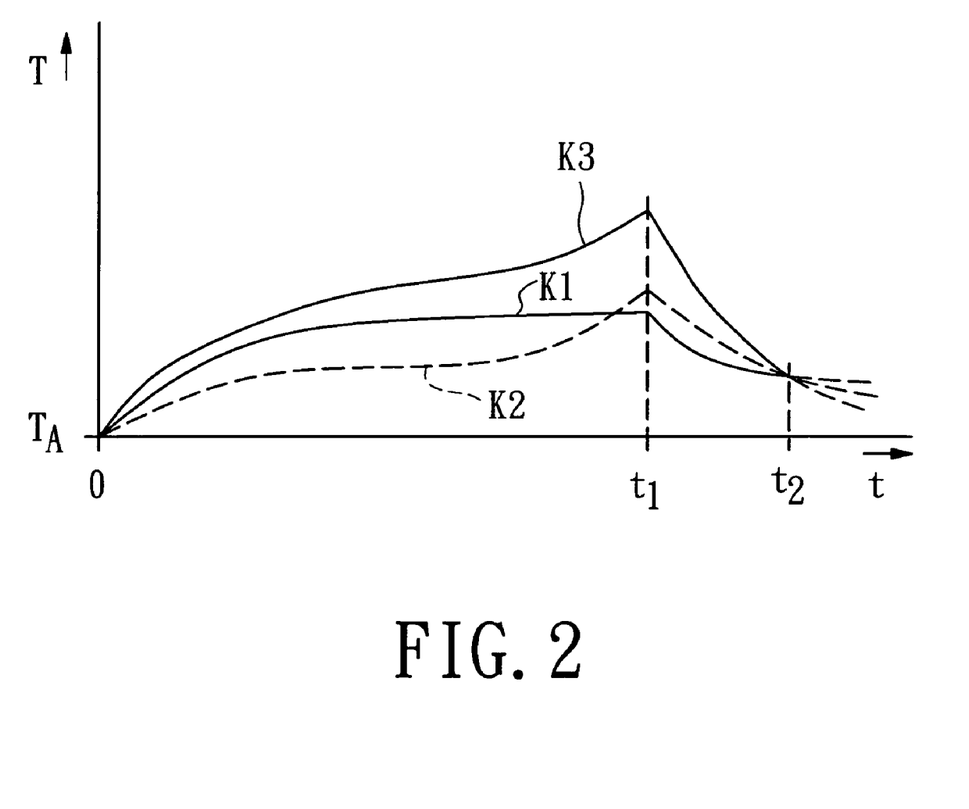
FIG. 2 is a temperature-time curve chart showing exhaust port temperature-time curve and pre-heating of air temperature-time curve as presented by the inventor on the tumble dryer for the drying of laundry according to U.S. Pat. No. 4,485,566.

According to the control method of U.S. Pat. No. 4,485,566, the temperature(T)-time(t) curve of the preheated air (10) obtained through the first temperature sensing means (12) is estimated to be curve K1 in FIG. 2, and the temperature(T)-time(t) curve of the discharged air (8) obtained through the second temperature sensing means (13) is estimated to be curve K3 in FIG. 2 (curve K2 in FIG. 2 is temperature(T)-time(t) curve of another design which is not described in detail by way of example, therefore no further discussion is necessary in this regard), wherein 0<t<t1 is the laundry clothes drying process; t1<t<t2 is the anti-wrinkling process to rapidly cool down the laundry clothes. According to this control method, the laundry clothes is regarded well dried when the temperature difference between K3 and K1 in FIG. 2 reaches a predetermined value, i.e., t−t1, and the central control unit cuts off power supply from the electric heater, keeping the fan and the drum motor in operation to run the anti-wrinkling process. However, curve K3 and curve K1 intersects when t=t2. This does not appear consistent with Second Law of Thermodynamics. Because curve K3 is a high temperature curve, and curve K1 is a temperature curve heated by high temperature curve K3, the temperature difference between curve K3 and curve K1 will always be greater than zero, and temperature difference between curve K3 and curve K1 will be equal to zero only when the time is infinity. Therefore, curve K3 and curve K1 are misleading temperature-time curves. Further, with respect to anti-wrinkling process, when the temperature difference between curve K3 and curve K1 is reduced to about the predetermined positive/negative value, i.e., at the time t=t2, it means the clothes (or materials) has been cooled down to a certain extent, and the central control unit will switch off the main power to shut down the machine. However, this design may encounter the problem that anti-wrinkling process is incomplete due to that the predetermined positive the temperature difference value is excessively high and the controlled time t2 is too short, or the motor is excessively operated to waste much energy and time due to that the predetermined positive temperature difference value is excessively low and the controlled time t2 is too long.

Figure 4:
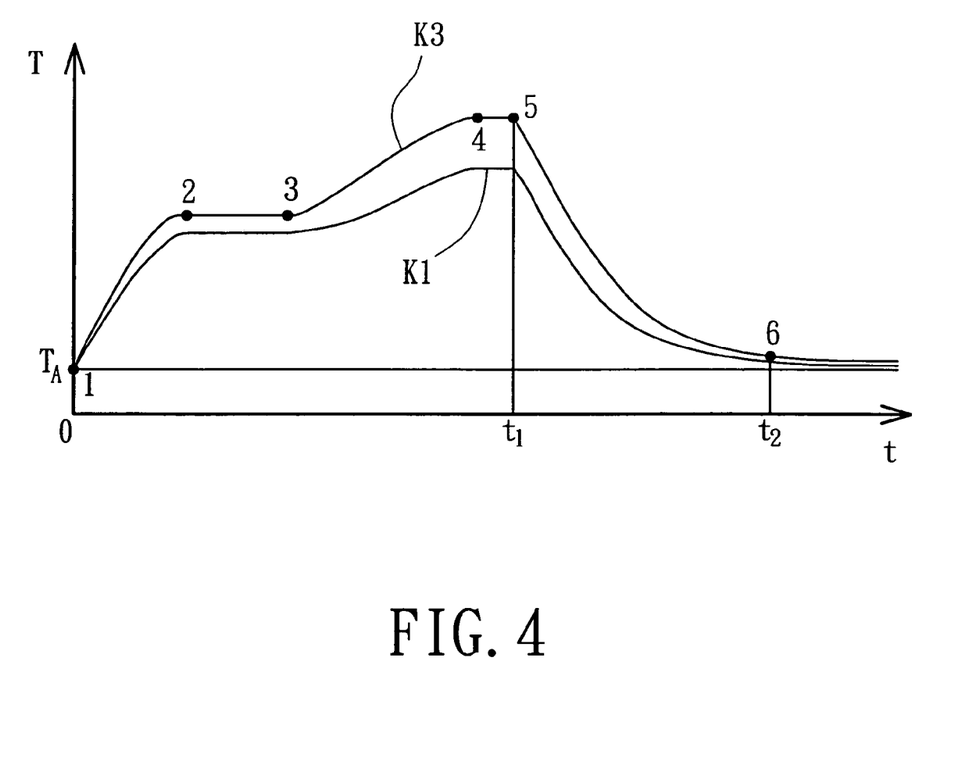
FIG. 4 is a corrected temperature-time curve chart showing exhaust port temperature-time curve and pre-heating of air temperature-time curve referring the tumble dryer for the drying of laundry referring to U.S. Pat. No. 4,485,566 and according to Thermodynamic second law and experiment results of the present invention.

According to our tests, the temperature and relative humidity of the air outside the drying machine and the types and weight of the laundry clothes affect the value of the temperature difference between curves K3 and K1. Therefore, there is no reliable predetermined value shows a specific relationship with the dryness of the laundry clothes. If the predetermined value is set too low, the laundry clothes may be not well dried due to the conditions of low temperature and/or high relative humidity and/or laundry clothes' high water-retaining ability and/or laundry clothes' heavy weight. If the predetermined value is set too high, much energy and controlled time will be wasted due to the conditions of high temperature and/or low relative humidity and/or laundry clothes' low water-retaining ability and/or laundry clothes' light weight. If the predetermined value for the temperature difference between curve K3 and curve K1 in FIG. 4 is set too high and higher than the maximum temperature difference under the weather condition and the clothes' type and weight while the drying machine is operating, the temperature difference between curve K3 and curve K1 may never reach and the drying machine may never cut off power supply to the electric heater automatically. Therefore, the aforesaid two control have limitations in actual practice. More particularly, the method of automatically cutting off power supply to the electric heater imparts a difficulty in commercialization of this design.

SUMMARY OF THE INVENTION

The present invention has been accomplished under the circumstances in view. The invention uses the drying principle of a drying machine to suck in air, and then to heat the intake flow of air into a dry air having a medium high temperature and a low relative humidity by an electric heater, and then the hot air mixes with the wet clothes (or materials) in a rotary drum that is rotated by a motor, thereby causing water to be evaporated from the laundry clothes (or materials) into the air inside the rotary drum, thus the dry air with medium high temperature and low relative humidity is wetted and resulted in lowering its temperature and increasing its relative humidity, and the wet air is then expelled to the outside of the drying machine by means of a pressure difference. If the water content of the laundry clothes (or materials) is still high, the relative humidity at the exhaust port of the drying machine is at the saturated state, i.e., about 100%, and the temperature becomes wet bulb temperature at that moment. Following the operation of the drying machine, the clothes (or materials) are gradually dried. When the relative humidity in the rotary drum of the drying machine is gradually reduced from the saturated state (100%) as the water content of the clothes (or materials) is lowering, the temperature in the rotary drum of the drying machine is gradually increased. When the laundry clothes (or materials) are well dried, no more water inside the laundry clothes (or materials) can be evaporated into the air and thus the temperature and relative humidity of the expelled air will maintain constant. Based on this principle, we created the power-saving drying machine control method to automatically shut off the drying machine. According to the present invention, a temperature (or relative humidity) sensor is installed in the front side of the exhaust port of the drying machine and linked to a central control unit. When the temperature (or relative humidity) sensor detected a predetermined "temperature of start-function" (or "relative humidity of start-function"), the temperature control unit (or relative humidity control unit) of the central control unit starts working to measure the temperature (or relative humidity) at the exhaust port through the temperature (or relative humidity) sensor to detect a value per a predetermined time interval. When the differences of detected temperature (or relative humidity) between at least three detected temperature (or relative humidity) values are shown within the detection precision of the temperature (or relative humidity) sensor, it means that the laundry clothes (or materials) are well dried, at this time the central control unit automatically shuts off drying machine, preventing overheating. Further, the drying machine can be designed to cut off power supply from the electric heater without stopping the drum motor and the fan after the laundry clothes (or materials) have been well dried, so that the fan keeps drawing colder indoor air into the drying machine to cool down the clothes in the rotary drum to complete the so-called anti-wrinkling process, and during the anti-wrinkling process, it can also enable the remaining heat energy in the clothes to reduce the relative humidity and to dry the dead angle areas of the clothes (or materials), and the central control unit shuts off the drying machine when the differences of detected temperature (or relative humidity) between at least three detected temperature (or relative humidity) values are shown within twice the detection precision of the temperature (or relative humidity) sensor.

Therefore, it is the main object of the present invention to provide a power-saving drying machine control method, which uses a temperature (or relative humidity) sensor to detect the temperature at the front side of the exhaust port of the drying machine, and a central control unit to control the operation of the temperature (or relative humidity) sensor and to automatically shut off the drying machine when the variation of detection within a predetermined time interval is approximately zero or very small. It is another object of the present invention to provide a power-saving drying machine control method, which cuts off power supply from the electric heater and keeps the rotary drum motor and the fan working for enabling indoor cold air to enter the rotary drum and to cool down the well-dried clothes (or materials), and then shuts off the drying machine after the dry clothes (or materials) have been cooled down.

DETAILED DESCRIPTION OF THE PREFERRED EMBODIMENT

Figure 3:
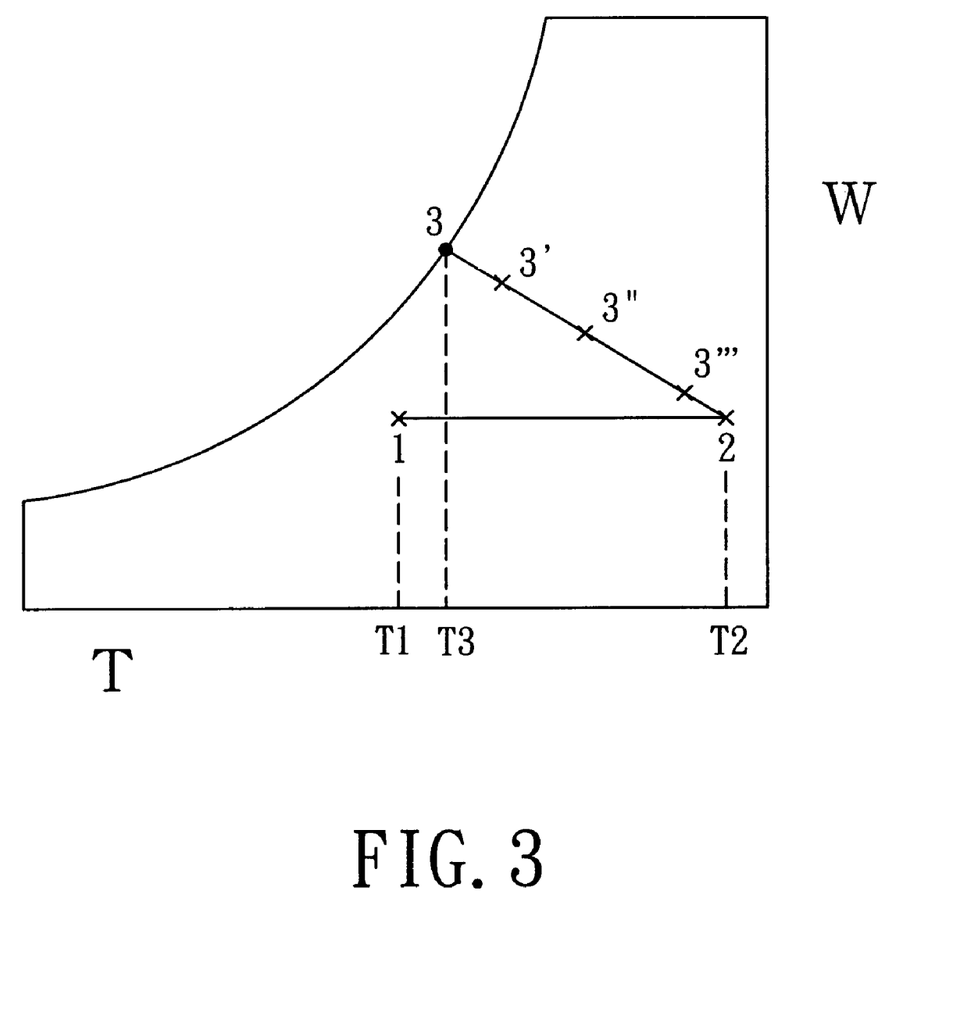
FIG. 3 is a schematic drawing explaining the drying principle shown in a psychometric chart of a drying machine according to the present invention.

The drying principle of a drying machine is outlined hereinafter with reference to the psychometric chart shown in FIG. 3. The drying machine uses an electric heater to heat intake air (status 1) into a dry air having a medium high temperature and low relative humidity (status 2), a motor and a transmission mechanism to rotate a drum alternatively forwards and backwards for enabling the water-carrying clothes or materials in the drum to be mixed with the hot-dry air having a medium high temperature and low relative humidity and the contained water to be evaporated from the clothes or materials in the drum into vapor and for enabling the moisture-contained air to be expelled out of the drying machine by means of a pressure difference (status 3). If the water content of the clothes (or materials) is still high, the relative humidity of status 3 $\Phi_3$ is close to 100%, the temperature of status 3 $T_3$, is close to wet bulb temperature, is lower than the temperature of status 2 $T_2$. Following running of the drying machine, the wet clothes (or materials) are gradually heated to a dry status, and the temperature $T_3$ and relative humidity $\Phi_3$ are approaching status 2 along the approximate constant wet bulb temperature curve; i.e.; 3-3'-3"-3"'-2, relative humidity lowering to about the relative humidity value $\Phi_2$ of status 2 and temperature rising to about $T_2$. When the clothes (or materials) are fully dried, it becomes equal to status 2, and the temperature does not rise anymore (or the relative humidity value of status 2 does not drop anymore). According to the exhaust temperature characteristic of the aforesaid drying machine, when the clothes (or materials) are fully dried, the exhaust temperature of the drying machine is maintained at a high level (or the relative humidity is maintained at a low level). At this time, the electric heater can be turned off to save power and time consumption.

According to tests based on the aforesaid thermodynamic principle, curve K1 of the temperature-time curve T=f(t) is the temperature path of the preheated air during a drying cycle and curve K3 of the temperature path of the air discharged from the dryer should be in conformity with curves K3 and K1 in FIG. 4, but not the unreasonable curves in FIG. 2 which are believed to be somewhat misleading.

Curve K3 in FIG. 4 rises rapidly from point 1 relative to room temperature $T_A$, therefore the slope of the rising curve 1-2 is relatively sharper. During this status, the temperature increasing effect generated by heater is greater than the temperature reducing effect of evaporating of water contained in wet clothes (or materials). When the temperature increasing effect generated by heater and the temperature reducing effect of evaporating of water contained in wet clothes (or materials) are equalized, the slope of the rising curve is reduced to approximately the horizontal status, i.e., the position at point 2. At this time, the relative humidity is close to 100% and the temperature is maintained close to wet bulb temperature, and therefore the temperature change is significant. This condition is maintained from point 2 through point 3. When the water content of the wet clothes (or materials) is gradually reducing following running of the drying machine to such a status that the air discharged from the drying machine cannot maintain the saturated status 3, the relative humidity is gradually reduced and the temperature is gradually increased. When the clothes (or materials) are fully dried, the temperature of the air is increased to the maximum temperature generated by the electric heater, and the slope of the rising curve is smoothened to the horizontal status, i.e., the position at point 4. After point 4, the temperature is maintained approximately to the horizontal status as shown in 4-5 in FIG. 4. At this time, the clothes (or materials) are well dried, and the electric heater can be turned off. Therefore, electricity is cut off from the electric heater at point 5 (t=t1). At this time, the motor and fan of the drying machine keep operating to suck in the outside colder air into the drying machine to cool down the well-dried clothes in order to prevent the wrinkle of the clothes if the drying machine is designed for drying laundry clothes. At this time, the hotter dry status clothes (or materials) heats the intake colder outside air to reduce the relative humidity of air so as to dry the dry status clothes (materials) continuously, ensuring to evaporate the water may still be kept in the dead corners of clothes (or materials). Because electric heating is stopped, the temperature of the air discharged from the drying machine is rapidly reduced, showing a sharp descending slope of temperature curve, and the descending slope of temperature curve is smoothened to about a horizontal status at point 6 at the time t=t2. At this time, the temperature of the clothes (or materials) is close to the temperature outside the drying machine, i.e., the clothes (or materials) is cooled down enough, and the central control unit can control the main power switch to switch off the drying machine. Further, the temperature difference between the temperature-time curve K1 and temperature-time curve K3 is gradually increased at segment 1-2, and then maintained approximately equal at segment 2-3, and then gradually increased again at segment 3-4, and then maintained approximately equal at segment 4-5, and then gradually reduced at segment 5-6. Therefore, it is complicated and of limited accuracy to control the operation of the drying machine based on a certain value of the temperature difference between curve K1 and curve K3.

According to the control method of U.S. Pat. No. 4,485,566, the laundry clothes is regarded well dried when the temperature difference between K3 and K1 in FIG. 2 reaches a predetermined value, i.e., t=t1 and the central control unit cuts off power supply from the electric heater at first. In comparison to FIG. 4, it is not certain that the greatest temperature difference between curve K3 and curve K1 shown in FIG. 2 reaches that of point 4 shown in FIG. 4, and the laundry clothes (materials) may be not well dried when the greatest temperature between curve K3 and curve K1 does not reaches. According to our tests, the temperature and/or relative humidity of the air (the state of air outside the drying machine) and/or the water-retaining ability and/or weight of the laundry clothes (or materials) affect the maximum value of the temperature difference between curves K3 and K1. Therefore, there is no reliable predetermined maximum temperature difference value shows a specific relationship with the dryness of the laundry clothes (or materials). If the predetermined maximum temperature difference value is set too low, the laundry clothes (or materials) may be not well dried due to the state of air outside the drying machine with a low temperature and/or high relative humidity and/or laundry clothes' (or materials') with a high water-retaining ability and/or with a heavy weight. If the predetermined value is set too high, much energy and time will be wasted due to the state of air outside the drying machine with a high temperature and/or low relative humidity and/or laundry clothes' (or materials') with a low water-retaining ability and/or with a light weight. If the predetermined maximum temperature difference value between curve K3 and curve K1 shown in FIG. 4 is set too high and higher than the maximum temperature difference under the weather condition and the clothes' (materials') type and weight at the time the drying machine is operating, the predetermined maximum temperature difference value between curve K3 and curve K1 shown in FIG. 4 may never appear and the drying machine may never cut off power supply from the electric heater automatically. Further, with respect to anti-wrinkling process (5-6 shown in FIG. 4), when the temperature difference between curve K3 and curve K1 is reduced to about the predetermined value (it must be a positive value), i.e., at the time t=t2, it means the clothes (or materials) has been cooled down to a certain extent, and the central control unit will switch off the main power to shut down the machine. However, this design may encounter the problem that anti-wrinkling process is incomplete due to that the predetermined temperature difference value is too high and the stop time t2 will be too short, or the motor is excessively operated to waste much energy and time due to that the predetermined temperature difference value is too low and the stop time t2 will be too long. Therefore, the aforesaid two control methods have undesireable aspects in actual practice. More particularly, the above undesireable method of automatically cutting off power supply from the electric heater becomes a restraint to commercialization of the design.

Figure 1:
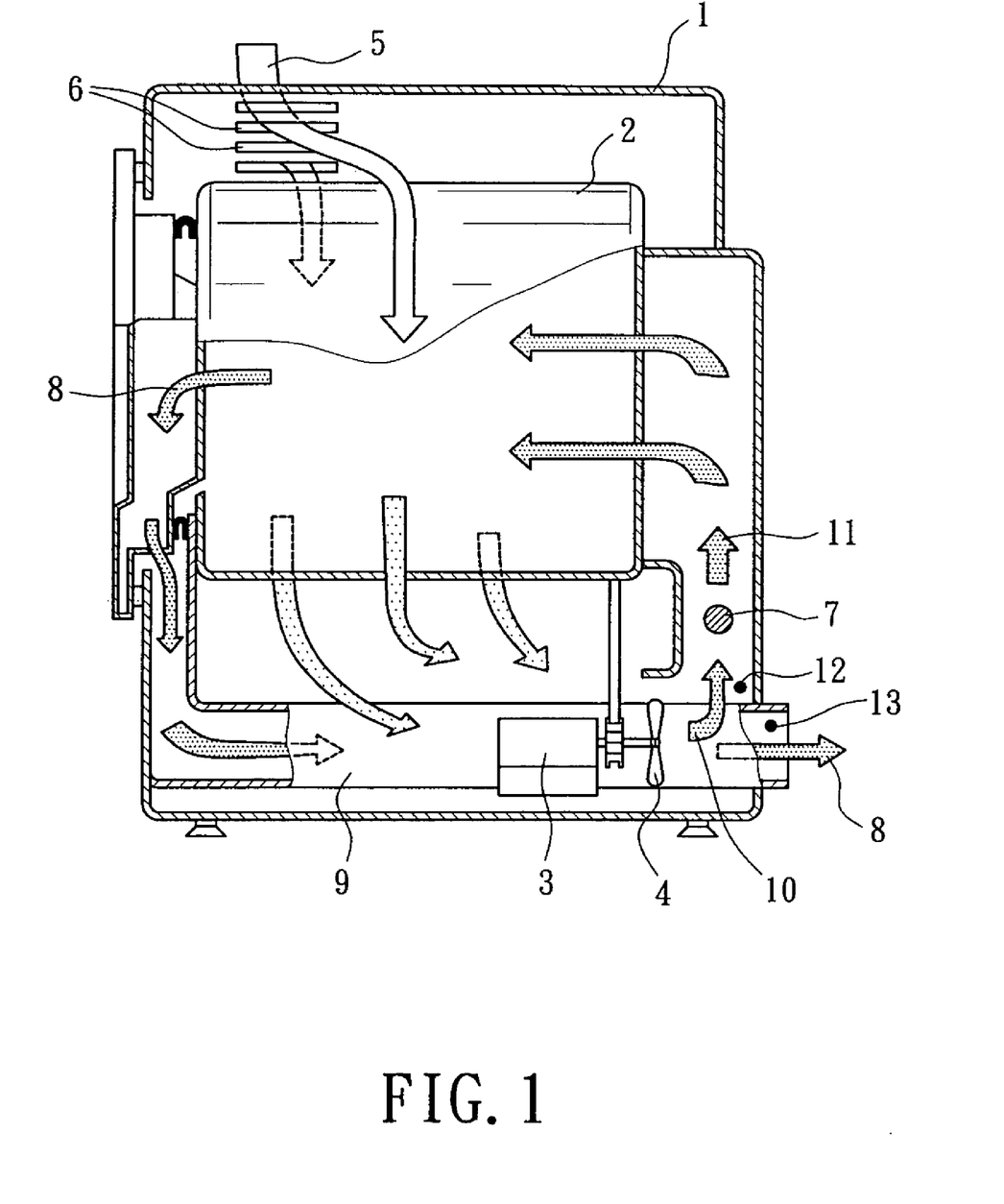
FIG. 1 is a schematic drawing showing the structure of a tumble dryer for the drying of laundry according to U.S. Pat. No. 4,485,566.
Figure 5:
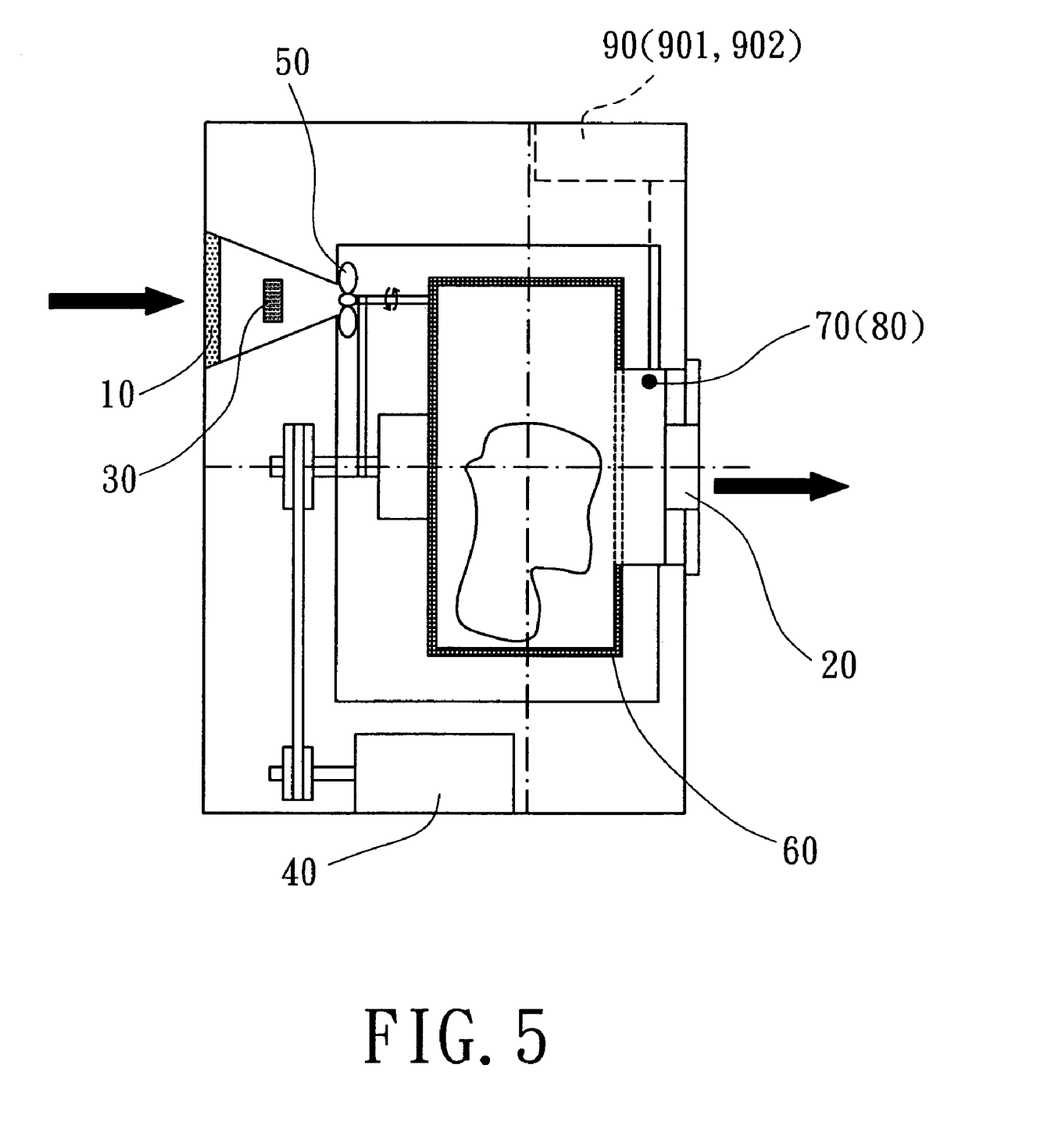
FIG. 5 is a schematic drawing showing the structure of the drying machine according to the present invention.

It is clear that the air in the drum of the drying machine with a thermal recycling function in FIG. 1 has a relatively higher temperature to provide a relative better drying ability, however because a part of the heat energy of the air in the drum is used to pre-heat the air entering the drying machine, the temperature at the exhaust port has been reduced. Therefore, either in the drying machine without thermal recycling function in FIG. 5 or the drying machine with a thermal recycling function in FIG. 1, the temperature-time curve K3 at the exhaust port is close to that of the temperature-time curve K3 in FIG. 4 with the exception that the temperature-time curve may be shifted horizontally upwards or downwards subject to the change of weather condition and/or the change of the type and weight of the laundry clothes (or materials). Therefore, the invention needs only to make a control subject to the characteristic of the temperature-time curve K3 at the exhaust port to achieve the object of automatically shutting off the drying machine immediately after the laundry clothes (or materials) have been fully dried, or cutting off power supply from the electric heater and then turning of the main power after termination of the anti-wrinkling process.

Therefore, the "power-saving and auto shut-off method for drying machine" of the present invention uses a central control unit and a temperature sensor provided at a certain point in front of the exhaust port of the drying machine and linked to the central control unit to control starting of a temperature control unit (or humidity control unit) when the temperature at the exhaust port reaches a predetermined start-function temperature level (or start-functioning humidity level), causing the temperature control unit (or humidity control unit) to work the temperature (or humidity), and automatically shut off the drying machine when the detected variations of several predetermined time intervals are approximately equal to zero. When the detected variations of several predetermined time intervals are approximately equal to zero, it means that the laundry clothes (or materials) has been well dried, and therefore the drying machine can be shut off. According to the present invention, the drying machine comprises an air inlet 10, an exhaust port (air outlet) 20, an electric heater 30, a motor 40, a fan 50, a rotary drum 60, a temperature sensor 70 (or humidity sensor 80), and a central control unit 90 (see FIG. 5). The central control unit 90 comprises a temperature control unit 901 (or relative humidity control unit 902). The temperature sensor 70 (or relative humidity sensor 80) is provided at a certain point in front of the exhaust port 20 and electrically connected to the central control unit 90. When detected the presence of the predetermined starting temperature (or relative humidity), $T_s$ shown in Attachment II, the temperature control unit 901 (or relative humidity control unit 902) of the central control unit 90 starts to function and to detect the temperature (or humility) once per a predetermined time interval (for example, one minute). When at least two temperature differences between at least three detected temperature values are shown within the detection precision of the temperature sensor (normally within about 0.1° C.~0.5° C.) or when two relative humidity differences between at least three detected relative humidity values are shown within the detection precision of the relative humidity sensor (normally within about 0.2%~1%), it means that the laundry clothes (or materials) are well dried, at this time, the central control unit 90 automatically cuts off power supply from the electric heater and shuts off the drying machine.

An anti-wrinkling process may be added, i.e., when the laundry clothes have been well dried, the central control unit 90 cuts off power supply from the electric heater 30, keeping the motor 40 in rotating the rotary drum 60 and the fan 50 in drawing indoor colder air into the drying machine to cool down the clothes in the rotary drum 60, for enabling the remaining heat energy in the clothes to reduce the air's relative humidity and to dry the dead angle areas of the clothes. Therefore, the clothes are dried continuously. During this anti-wrinkling process, the temperature sensor (or relative humidity sensor) detects the temperature (or relative humidity) at the exhaust port once per every predetermined time interval (for example, one minute). When at least two temperature differences between at least three detected temperature values are shown within twice the detection precision of the temperature sensor (normally within about 0.2° C.~1.0° C.) or when at least two relative humidity differences between at least three detected relative humidity values are shown within twice the detection precision of the relative humidity sensor (normally within about 0.4%~2%), it means that the clothes has been cooled down, at this time, the central control unit 90 automatically shuts off the drying machine (see Attachment I temperature-time curve of electric heater off control and drying machine shut-off control after completion of anti-wrinkling process).

The invention will now be described by way of example as follows:

Immediately after start of the drying machine, continuously detect the temperature (or relative humidity). The temperature control unit 901 (or relative humidity control unit 902) starts to work when the temperature or relative humidity at the front side of the exhaust port 20 reached a start-control temperature (or relatively humidity) set in a setting controller. The start-control temperature can be the mean value of the constant temperature at first segment and the constant maximum temperature at the second segment of the temperature-time curve K3 in FIG. 4, for example $T_s=38°$ C. in Taiwan area (see Attachment II: start-control temperature, Ts). The start-control relative humidity can be the mean value of the constant relative humidity at the first segment and the constant least relative humidity at the second segment of curve K3, for example, 35% in Taiwan area. When started, the temperature control unit 901 or relative humidity control unit 902 detects the temperature or relative humidity once per miniature. When three temperature differences between four detected temperature values are shown within the detection precision of the temperature sensor, for example, 0.2° C. (or when three relative humidity differences between at four detected relative humidity values are shown within the detection precision of the relative humidity sensor for example, 0.4%), it means that the clothes has been well dried, at this time, the central control unit 90 cuts off power supply from the electric heater 30, however the motor 40 which drives the rotary drum 60 and the fan 50 keep operating, enabling indoor colder air to be continuously drawn into the rotary drum 60 to cool down the clothes in the rotary drum 60, preventing wrinkling of the clothes, at the same time the remaining heat energy in the clothes heats the intake air and reduce its relative humidity, thus the pretty dry air can dry the dead angle areas of the clothes, i.e., drying the clothes continuously. When three temperature differences between four temperature values obtained from the front side of the exhaust port 20 are shown within twice the detection precision of the temperature sensor, for example, 0.4° C. (or when three relative humidity differences between four relative humidity values obtained from the front side of the exhaust port 20 are shown within twice the detection precision of the relative humidity sensor, for example, 0.8%), it means that the clothes has been cooled down, at this time the central control unit 90 automatically cuts off main power to shut off the drying machine.

In the aforesaid example, the control is based on three temperature (or relative humidity) differences between four temperature (or relative humidity) values. In actual practice, the control can be successful when based on two temperature (or relative humidity) differences between at least three temperature (or relative humidity) values. Therefore, when at least two temperature differences between at least three temperature values are shown within the detection precision of the temperature sensor, normally, about 0.1° C.~0.5° C. (or at least two relative humidity differences between at least three relative humidity values are shown within the detection precision of the relative humidity sensor, normally, about 0.2%~1%), the electric heater 30 can be turned off. The control method is as shown in Attachment I.

Therefore, the invention eliminates the drawbacks of the prior art drying machine control method by time estimation (i.e., the problem that the clothes may be not well dried if the set time is insufficient, or the clothes may be overheated and much energy and time may be wasted if the set time is too long). In general, the invention saves much energy and work time, well protects the clothes, and suitably prevents wrinkling of the clothes and injury of the user's hands caused by hot clothes.

Figure 6:
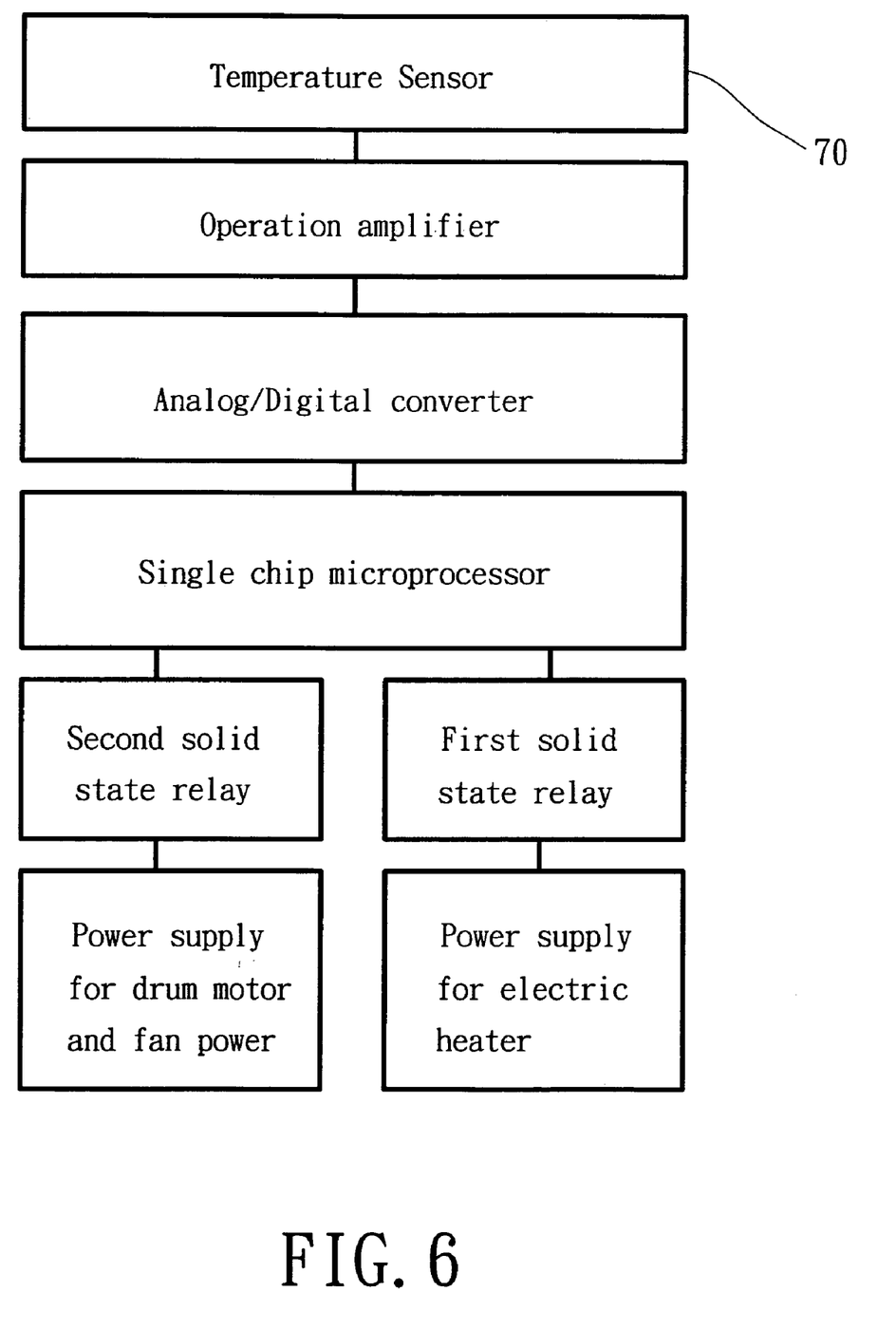
FIG. 6 is a control circuit diagram of the present invention.
Figure 7:
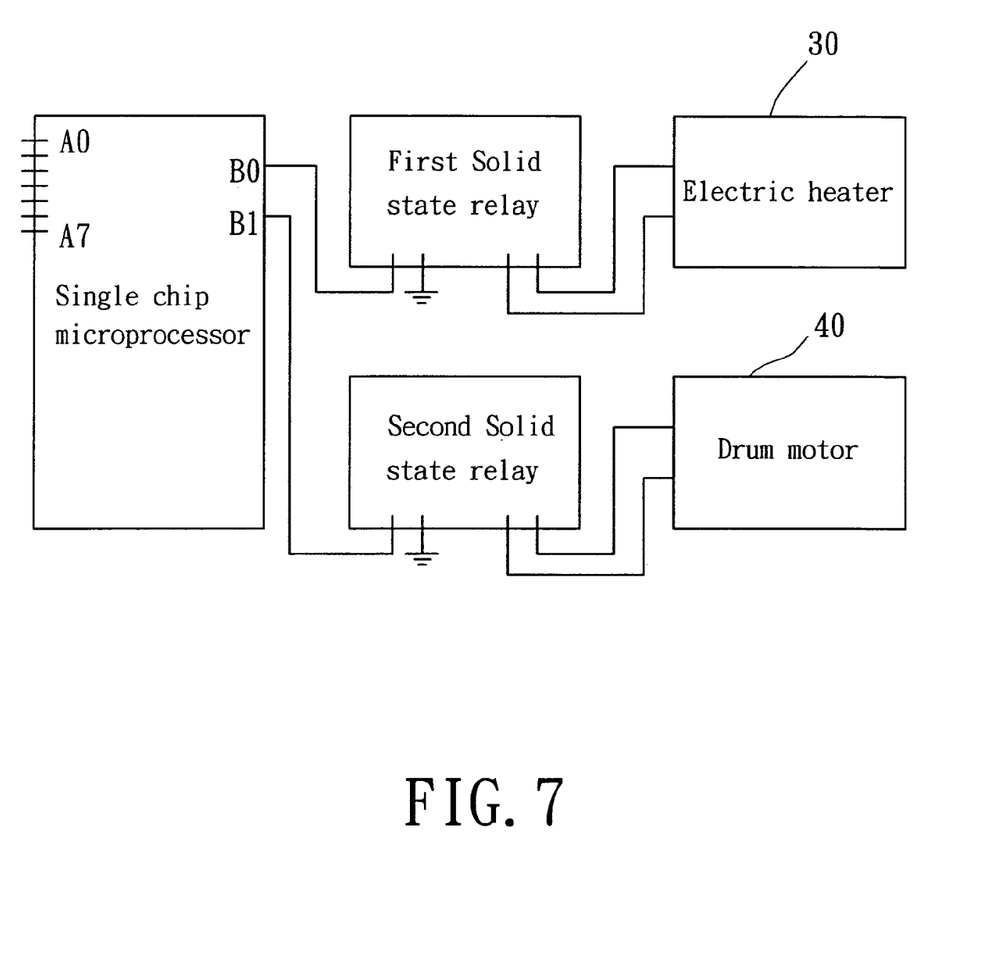
FIG. 7 is a circuit diagram of a single chip microprocessor and two solid-state relays according to the present invention.

FIG. 6 is a circuit diagram of the control system according to the present invention. FIG. 7 is a demo diagram of a single-chip microprocessor and first and second solid-state relays according to the present invention. As these hardware control systems are of the known art and not within the scope of the claims of the present invention, not further detailed description in this regard is necessary. According to the characteristics of the temperature-time curve K3 obtained from our test on a drying machine without thermal recycling function that explain power off control of the electric heater 30 and drying machine shut-off control after completion of the anti-wrinkling process, curve K3 has three segments that show small temperature variation. The first segment of curve K3 that shows small temperature variation corresponds to the status where the wet clothes are being dehydrated in the rotary drum of the drying machine, the temperature in the rotary drum is relatively low and close to wet bulb temperature, and the air in the rotary drum contains saturated moisture and the relative humidity is close to 100% (see curve segment 3-3 in FIG. 3). The second segment of curve K3 that shows small temperature variation corresponds to the status where the clothes have been well dried, the temperature in the rotary drum is relatively high and the relative humidity is relatively low (see curve segment 2-2 in FIG. 3). In order to cut off power supply from the electric heater based on the second status (second segment 2-2 of curve K3), it must skip over the first status (first segment 3-3 of curve K3). Therefore, the mean value of the low temperature of the first status and the high temperature of the second status is used as the predetermined start-control temperature Ts (for example, the start control temperature Ts can be set to be 38° C. in Taiwan) to initiate the single chip microprocessor and the solid state relays (see Attachment II). Starting from Ts, the temperature at the exhaust port is detected once per minute, and each two-temperature difference between proceeding temperature-values obtained at the exhaust port are compared. As shown in Attachment II, four temperature values T1, T2, T3, T4 are obtained during the second curve segment that show small temperature variation. When (T2–T1), (T3–T2) and (T4–T3) are all below the precision TL1 of the temperature sensor (for example, 0.2° C.), it means that the clothes have been well dried, and the heating process should be stopped. Thus, the single chip microprocessor outputs "0" potential signal, driving the first solid-state relay to cut off power supply from the electric heater.

With respect to off control of the motor and the fan after completion of the anti-wrinkling process to cool down the well-dried clothes, the motor 40, which drives the rotary drum, 60 and the fan 50 keep operating after off of the electric heater. When the temperature is lowered to the status where four temperature values T5, T6, T7, T8 are obtained during the third curve segment that show small temperature variation and when (T6–T5), (T7–T6) and (T8–T7) are all within twice the precision of the temperature sensor TL2 (for example, 0.4° C.), the single chip microprocessor outputs "0" potential signal, driving the second solid state relay to cut off power supply from the motor and the fan. Thus, clothes drying and anti-wrinkling processes are finished.

As indicated above, the concept of the present invention to automatically shut off the drying machine can accurately judge the drying status of the laundry clothes, i.e., the invention cuts off power supply when the laundry clothes have been well dried, preventing overheating of the clothes that may cause damage to the clothes. When an anti-wrinkling process is added, the user can take the clothes out of the drying machine immediately after the drying machine has been shut off, and the well-dried clothes do not wrinkle, the clothes is not hot will not scald the user's hands and less static electricity attached to reduce the static electricity shock. The practical and humanization design of the invention saves much laundry clothes drying energy and time. The method of the present invention can be used in any of a variety of conventional laundry clothes dryers to attract consumers to buy and to improve suppliers' market competitiveness. Besides, the above said drying machine may be substituted with a laundry dryer or an electrical dryer.

Although particular embodiments of the invention have been described in detail for purposes of illustration, various modifications and enhancements may be made without departing from the spirit and scope of the invention.

What is claimed is:

1. A power-saving drying machine control method used in a drying machine comprising an air inlet, an exhaust port, an electric heater, a motor, a fan, a rotary drum, a temperature sensor provided at a front side of said exhaust port, and a central control unit electrically connected to said temperature sensor, said central control unit comprising a temperature control unit, the power-saving drying machine control method comprising the steps of (a) enabling said temperature control unit of said central control unit to start working and to detect the temperature at said exhaust port through said temperature sensor once per a predetermined time unit when said temperature sensor detected a predetermined temperature value, and (b) driving said central control unit to shut off said drying machine when at least two temperature differences of at least three proceeding temperature values obtained from said exhaust port through said temperature sensor are within the precision of said temperature sensor.

2. A power-saving drying machine control method used in a drying machine comprising an air inlet, an exhaust port, an electric heater, a motor, a fan, a rotary drum, a relative humidity sensor provided at a front side of said exhaust port, and a central control unit electrically connected to said relative humidity sensor, said central control unit comprising a relative humidity control unit, the power-saving drying machine control method comprising the steps of (a) enabling said relative humidity control unit of said central control unit to start working and to detect the relative humidity at said exhaust port through said relative humidity sensor once per a predetermined time unit when said relative humidity sensor detected a predetermined relative humidity value, and (b) driving said central control unit to shut off said drying machine when at least two relative humidity differences of at least three proceeding relative humidity values obtained from said exhaust port through said relative humidity sensor are within the precision of said relative humidity sensor.

3. The power-saving drying machine control method as claimed in claim 1, wherein the precision of said temperature sensor is within about 0.1° C.~0.5° C.

4. The power-saving drying machine control method as claimed in claim 2, wherein the precision of said relative humidity sensor is within about 0.2%~1.0%.

5. The power-saving drying machine control method as claimed in claim 1, wherein said predetermined temperature value to initiate said temperature control unit is the mean value of the temperature value obtained from the first and the second small temperature variation segments of the temperature-time curve of the exhausted air detected at a front side of said exhaust port of drying machine.

6. The power-saving drying machine control method as claimed in claim 2, wherein said predetermined relative humidity value to initiate said relative humidity control unit is the mean value of the relative humidity value obtained from the first and the second small relative humidity variation segments of the relative humidity-time curve of the exhausted air detected at a front side of said exhaust port of drying machine.

7. The power-saving drying machine control method as claimed in claim 1, said step (b) comprising a first sub-step of enabling said central control unit to cut off power supply from said electric heater and to keep said motor and said fan in operation when at least two temperature differences of at least three proceeding temperature values obtained from said temperature sensor are within the precision of said temperature sensor, and a second sub-step of enabling said central control unit to shut off said drying machine when two temperature differences of at least three proceeding temperature values obtained from said temperature sensor are within twice the precision of said temperature sensor.

8. The power-saving drying machine control method as claimed in claim 2, said step (b) comprising a first sub-step of enabling said central control unit to cut off power supply from said electric heater and to keep said motor and said fan in operation when at least two relative humidity differences of at least three proceeding relative humidity values obtained from said relative humidity sensor are within the precision of said relative humidity sensor, and a second sub-step of enabling said central control unit to shut off said drying machine when two relative humidity differences of at least three proceeding relative humidity values obtained from said relative humidity sensor are within twice the precision of said relative humidity sensor.

9. The power-saving drying machine control method as claimed in claim 1, wherein said drying machine is a laundry dryer.

10. The power-saving drying machine control method as claimed in claim 2, wherein said drying machine is a laundry dryer.

11. The power-saving drying machine control method as claimed in claim 1, wherein said drying machine is an electrical dryer.

12. The power-saving drying machine control method as claimed in claim 2, wherein said drying machine is an electrical dryer.

* * * * *